(12) United States Patent
Cannata, Jr. et al.

(10) Patent No.: US 11,695,561 B2
(45) Date of Patent: *Jul. 4, 2023

(54) DECENTRALIZED AUTHORIZATION OF USER ACCESS REQUESTS IN A MULTI-TENANT DISTRIBUTED SERVICE ARCHITECTURE

(71) Applicant: FMR LLC, Boston, MA (US)

(72) Inventors: Robert Charles Cannata, Jr., Hingham, MA (US); Arun Nadger, Cumberland, RI (US); Kelsey Sattler, Boston, MA (US); John Peter Chinnappan, Natick, MA (US); Rohith Reddy Beravelli, New Hill, NC (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,705

(22) Filed: Aug. 23, 2022

(65) Prior Publication Data

US 2023/0163967 A1 May 25, 2023

Related U.S. Application Data

(63) Continuation-in-part of application No. 17/531,319, filed on Nov. 19, 2021, now Pat. No. 11,431,513.

(51) Int. Cl.
*H04L 9/32* (2006.01)
*H04L 9/40* (2022.01)
*H04L 9/30* (2006.01)

(52) U.S. Cl.
CPC .......... *H04L 9/3213* (2013.01); *H04L 9/3073* (2013.01); *H04L 9/3268* (2013.01); *H04L 63/0281* (2013.01); *H04L 63/20* (2013.01)

(58) Field of Classification Search
None
See application file for complete search history.

(56) References Cited

U.S. PATENT DOCUMENTS

| 10,382,203 B1 | 8/2019 | Loladia et al. |
| 10,673,840 B2 | 6/2020 | Shukla et al. |
| (Continued) | | |

OTHER PUBLICATIONS

Ponomarev Kirill Yu, Attribute-based access control in service mesh, Nov. 2019, XIII International scientific and technical conference "Dynamics of Systems, Mechanisms and Machines", Omsk, Russia (Year: 2019).*

*Primary Examiner* — Arezoo Sherkat
(74) *Attorney, Agent, or Firm* — Cesari & McKenna, LLP

(57) ABSTRACT

Methods and apparatuses are described for decentralized authorization of user access requests in a distributed service architecture. A gateway node receives a user access request from a remote computing device. The gateway generates a signed and encrypted access token based upon the user access request using an authorization service node and a key management service node. The gateway transmits the access token, the user access request, and a security certificate received from the authorization service to a security proxy node of a microservice container. The security proxy validates the certificate and the access token. The security proxy decrypts the access token using a public key from the certificate, and determines user authorization to access a service endpoint node based upon the decrypted token. The security proxy transmits the user access request to the service endpoint, which provides the remote device with access to services based upon the user access request.

24 Claims, 9 Drawing Sheets

(56) References Cited

U.S. PATENT DOCUMENTS

| | | |
|---|---|---|
| 10,764,266 B2 | 9/2020 | Patwardhan et al. |
| 10,880,087 B2 | 12/2020 | Martynov et al. |
| 10,931,453 B2 | 2/2021 | Diaz et al. |
| 11,032,270 B1 | 6/2021 | Tsarfati et al. |
| 2017/0155641 A1* | 6/2017 | Fan .................. H04L 63/10 |
| 2018/0183793 A1 | 6/2018 | Mandadi et al. |
| 2018/0367528 A1 | 12/2018 | Schwarz et al. |
| 2019/0273746 A1* | 9/2019 | Coffing .................. G06Q 20/40 |
| 2020/0028848 A1 | 1/2020 | Gupta et al. |
| 2020/0358615 A1 | 11/2020 | Smolny et al. |
| 2021/0008457 A1* | 1/2021 | Schouviller ........... H04L 67/131 |
| 2021/0067537 A1 | 3/2021 | Khanna et al. |
| 2021/0377044 A1 | 12/2021 | Leibmann et al. |
| 2022/0337590 A1* | 10/2022 | Jaiswal ............... H04L 63/0815 |

* cited by examiner

HEADER (402):
{
"alg": "RS256",
"typ": "JWT",
}

PAYLOAD (404):
{
"id": "123456",
"name": "John Doe",
"role": "admin",
"access": "read", "write", "delete",
}

SIGNATURE (406):
SHA256(
base64urlEncode(header) + "." +
base64urlEncode(payload),
<signature>
) signature base64 encoded

DECENTRALIZED AUTHORIZATION OF USER ACCESS REQUESTS IN A MULTI-TENANT DISTRIBUTED SERVICE ARCHITECTURE

RELATED APPLICATIONS

This application is a continuation-in-part of U.S. patent application Ser. No. 17/531,319, filed on Nov. 19, 2021, the entirety of which is incorporated by reference herein.

TECHNICAL FIELD

This application relates generally to methods and apparatuses, including computer program products, for decentralized authorization of user access requests in a multi-tenant distributed service architecture.

BACKGROUND

Many distributed computing architectures that service a large number of users and client devices aim to provide fast and efficient processing of user requests. As can be appreciated, some applications provided by distributed computing architectures require real-time or near real-time responsiveness to user requests—such as equity trading platforms that serve tens of millions of users. Key performance goals for such systems include low network and transaction latency, high uptime and service availability, and scalability of processing and service bandwidth.

However, it can be difficult to achieve these performance goals in distributed computing systems while also ensuring the implementation robust security via multi-layered user authentication and user authorization. In typical paradigms, user authorization is conducted by reference to a central repository or service, such as an access control database or enterprise policy service, which defines roles and permissions for specific users and/or groups of users to access application functionality. In these situations, user authorization requests all flow through the central repository—leading to bottlenecks in transaction processing and limitations on the scalability of services. For applications that require high responsiveness and scalability, these issues and limitations have a detrimental impact on system performance and user satisfaction.

In addition, many enterprises are subject to certain regulatory, privacy, and compliance constraints that require strict separation between data of different customers or firms, and complete independence of transaction processing conducted for different customers. For example, a financial services platform may provide application functionality, data storage, and transaction execution for a multitude of different brokerage firms via a distributed computing environment. Governmental regulations require the financial services platform to ensure that firm-specific data, code, messaging, accounts, and other functionality are entirely separate from other firms and never shared or mixed. However, it is often technically difficult, costly, and time-consuming to achieve this goal, particularly in the context of a distributed computing architecture where default configurations of computing resources, services, security/authentication, and data stores encourage the on-demand use of hardware, networking, and software that is more cost-effective when a smaller amount of resources are used to service a large number of clients.

SUMMARY

Therefore, what is needed are methods and systems for providing fast and seamless validation of user access requests from multiple different customers, each having a separate computing resource and data allocation within a distributed multi-tenant computing architecture and without relying on a centralized authorization service. The techniques described herein advantageously enable decentralized user authorization and resource allocation through the use of microservice containers that are configured to evaluate user access requests and confirm user authorization on a per-request level using locally-provided policy management and key-based validation of tokenized access requests. In addition, the authentication and service access processes described herein are configured to provide tenant-specific functionality that is directly tied to an identity of the customer—which ensures separation and independence of each customer's applications, data, and messaging. As a result, the inventive methods and systems of the present disclosure beneficially achieve a robust, secure deployment of distributed service applications while also minimizing latency incurred by user authorization routines and enabling improved scalability and responsiveness of the applications.

The invention, in one aspect, features a computer system for decentralized authorization of user access requests in a distributed service architecture. The system comprises a gateway node, an authorization service node, a key management service node, and a plurality of microservice containers each comprising a security proxy node and a service endpoint node. The gateway node receives a user access request from a remote computing device. The gateway node generates a signed and encrypted access token based upon the user access request using the authorization service node and the key management service node. The gateway node transmits the access token, the user access request, and a security certificate received from the authorization service node to a security proxy node of a first one of the plurality of microservice containers. The security proxy node validates the security certificate and the access token received from the gateway node. The security proxy node decrypts the access token using a public key from the security certificate. The security proxy node determines user authorization to access the service endpoint node of the microservice container based upon the decrypted access token. The security proxy node transmits the user access request to the service endpoint node. The service endpoint node provides the remote computing device with access to one or more services based upon the user access request.

The invention, in another aspect, features a computerized method of decentralized authorization of user access requests in a distributed service architecture. A gateway node receives a user access request from a remote computing device. The gateway node generates a signed and encrypted access token based upon the user access request using an authorization service node and a key management service node. The gateway node transmits the access token, the user access request, and a security certificate received from the authorization service node to a security proxy node of a first one of a plurality of microservice containers. The security proxy node validates the security certificate and the access token received from the gateway node. The security proxy node decrypts the access token using a public key from the security certificate. The security proxy node determines user authorization to access the service endpoint node of the microservice container based upon the decrypted access token. The security proxy node transmits the user access request to a service endpoint node of the first one of the plurality of microservice containers. The service endpoint node provides the remote computing device with access to one or more services based upon the user access request.

Any of the above aspects can include one or more of the following features. In some embodiments, the gateway node authenticates the user access request before generating the signed and encrypted access token. In some embodiments, generating a signed and encrypted access token based upon the user access request using the authorization service node and the key management service node comprises generating, by the gateway node, an unencrypted access token comprising a user identifier associated with a user of the remote computing device and one or more access permissions associated with the user; transmitting, by the gateway node, the unencrypted access token to the authorization service node; requesting, by the authorization service node, a key pair from the key management service node, the key pair comprising a private key and the public key; signing and encrypting, by the authorization service node, the unencrypted access token using the private key; and transmitting, by the authorization service node, the signed and encrypted access token and the security certificate comprising the public key to the gateway node.

In some embodiments, determining user authorization to access the service endpoint node of the microservice container based upon the decrypted access token comprises: extracting, by the security proxy node, the user identifier and the one or more access permissions associated with the user from the decrypted access token; transmitting, by the security proxy node, the user identifier and the one or more access permissions associated with the user to a policy agent in the microservice container; and receiving, by the security proxy node from the policy agent, an indication to allow user access based upon the user identifier and the one or more access permissions. In some embodiments, validating the security certificate and the access token received from the gateway node comprises: requesting, by the security proxy node, the public key that corresponds to the access token from the key management service; validating, by the security proxy node, a signature in the security certificate using the public key; and validating, by the security proxy node, the access token using the security certificate. In some embodiments, the key management service node periodically rotates existing key pairs out of use and periodically rotates new key pairs into use.

In some embodiments, the plurality of microservice containers are independent of each other and the security proxy nodes of each microservice container do not use a central data repository or a central service to determine user authorization to access the service endpoint node of the microservice container based upon the decrypted access token. In some embodiments, providing the remote computing device with access to one or more services based upon the user access request comprises forwarding the user access request to one or more other service endpoint nodes that are coupled to the service endpoint node. In some embodiments, the one or more other service endpoint nodes provide the remote computing device with access to services based upon the user access request without requiring determination of user authorization to access the one or more other service endpoint nodes.

The invention, in another aspect, features a computer system for decentralized authorization of user access requests in a distributed service architecture. The system includes a gateway node, an authorization service node, a key management service node, a plurality of microservice containers each comprising a security proxy node, each microservice container associated with a different end user, and a plurality of service endpoint nodes, each service endpoint node associated with a different end user. The gateway node generates a first signed and encrypted access token based upon a first user access request using the authorization service node and the key management service node, the first user access request received from a first remote computing device associated with a first end user and the first access token comprising a identifier specific to the first end user. The gateway node generates a second signed and encrypted access token based upon a second user access request using the authorization service node and the key management service node, the second user access request received from a second remote computing device associated with a second end user and the second access token comprising a identifier specific to the second end user. The gateway node transmits the first access token, the first user access request, and a first security certificate received from the authorization service node to a security proxy node of a first one of the plurality of microservice containers that is associated with the first end user. The gateway node transmits the second access token, the second user access request, and a second security certificate received from the authorization service node to a security proxy node of a second one of the plurality of microservice containers that is associated with the second end user. The security proxy node of the first microservice container validates the first security certificate and the first access token, decrypts the first access token using a first public key from the first security certificate, determines authorization of the first end user to access a first service endpoint node based upon the decrypted first access token, and transmits the first user access request to the first service endpoint node to provide the first remote computing device with access to one or more services specific to the first end user based upon the first user access request. The security proxy node of the second microservice container validates the second security certificate and the second access token, decrypts the second access token using a second public key from the second security certificate, determines authorization of the second end user to access a second service endpoint node based upon the decrypted second access token, and transmits the second user access request to the second service endpoint node to provide the second remote computing device with access to one or more services specific to the second end user based upon the second user access request.

The invention, in another aspect, features a computerized method for decentralized authorization of user access requests in a distributed service architecture. A gateway node generates a first signed and encrypted access token based upon a first user access request using the authorization service node and the key management service node, the first user access request received from a first remote computing device associated with a first end user and the first access token comprising a identifier specific to the first end user. The gateway node generates a second signed and encrypted access token based upon a second user access request using the authorization service node and the key management service node, the second user access request received from a second remote computing device associated with a second end user and the second access token comprising a identifier specific to the second end user. The gateway node transmits the first access token, the first user access request, and a first security certificate received from the authorization service node to a security proxy node of a first one of a plurality of microservice containers that is associated with the first end user. The gateway node transmits the second access token, the second user access request, and a second security certificate received from the authorization service node to a security proxy node of a second one of the plurality of microservice containers that is associated with the second end user. The security proxy node of the first microservice container validates the first security certificate and the first access token, decrypts the first access token using a first public key from the first security certificate, determines authorization of the first end user to access a first service endpoint node based upon the decrypted first access token, and transmits the first user access request to the first service endpoint node to provide the first remote computing device with access to one or more services specific to the first end user based upon the first user access request. The security proxy node of the second microservice container validates the second security certificate and the second access token, decrypts the second access token using a second public key from the second security certificate, determines authorization of the second end user to access a second service endpoint node based upon the decrypted second access token, and transmits the second user access request to the second service endpoint node to provide the second remote computing device with access to one or more services specific to the second end user based upon the second user access request.

Any of the above aspects can include one or more of the following features. In some embodiments, the gateway node authenticates the first user access request before generating the first signed and encrypted access token and the gateway node authenticates the second user access request before generating the second signed and encrypted access token. In some embodiments, generating, by the gateway node, a first signed and encrypted access token based upon the first user access request using the authorization service node and the key management service node comprises generating, by the gateway node, a first unencrypted access token comprising the identifier specific to the first end user and one or more access permissions associated with the first end user and transmitting, by the gateway node, the first unencrypted access token to the authorization service node. The authorization service node requests a first key pair from the key management service node, the first key pair comprising a first private key and the first public key, signs and encrypts the first unencrypted access token using the first private key, and transmits the first signed and encrypted access token and the first security certificate comprising the first public key to the gateway node.

In some embodiments, determining, by the security proxy node of the first microservice container, authorization of the first end user to access a first service endpoint node based upon the decrypted first access token comprises extracting the identifier specific to the first end user and the one or more access permissions associated with the first end user from the decrypted first access token; transmitting the identifier specific to the first end user and the one or more access permissions associated with the first end user to a policy agent in the first microservice container; and receiving from the policy agent in the first microservice container an indication to allow the first end user to access the first service endpoint node based upon the identifier specific to the first end user and the one or more access permissions associated with the first end user. In some embodiments, validating, by the security proxy node of the first microservice container, the first security certificate and the first access token received from the gateway node comprises requesting the first public key that corresponds to the first access token from the key management service; validating a signature in the first security certificate using the first public key; and validating the encrypted first access token using the first security certificate.

In some embodiments, generating, by the gateway node, a second signed and encrypted access token based upon the second user access request using the authorization service node and the key management service node comprises generating, by the gateway node, a second unencrypted access token comprising the identifier specific to the second end user and one or more access permissions associated with the second end user and transmitting, by the gateway node, the second unencrypted access token to the authorization service node. The authorization service node requests a second key pair from the key management service node, the second key pair comprising a second private key and the second public key, signs and encrypts the second unencrypted access token using the second private key, and transmits the second signed and encrypted access token and the second security certificate comprising the second public key to the gateway node.

In some embodiments, determining, by the security proxy node of the second microservice container, authorization of the second end user to access a second service endpoint node based upon the decrypted second access token comprises extracting the identifier specific to the second end user and the one or more access permissions associated with the second end user from the decrypted second access token; transmitting the identifier specific to the second end user and the one or more access permissions associated with the second end user to a policy agent in the second microservice container; and receiving from the policy agent in the second microservice container an indication to allow the second end user to access the second service endpoint node based upon the identifier specific to the second end user and the one or more access permissions associated with the second end user. In some embodiments, validating, by the security proxy node of the second microservice container validating the second security certificate and the second access token received from the gateway node comprises requesting the second public key that corresponds to the second access token from the key management service; validating a signature in the second security certificate using the second public key; and validating the encrypted second access token using the second security certificate.

In some embodiments, the first microservice container is configured with a first namespace that is specific to the first end user and the second microservice container is configured with a second namespace that is specific to the second end user. In some embodiments, all processing services provided by the first microservice container are executed in isolation from all processing services provided by the second microservice container. In some embodiments, the first service endpoint node is configured with a first set of addresses that are specific to the first end user and the second service endpoint node is configured with a second set of addresses that are specific to the second end user. In some embodiments, the first remote computing device is prevented from accessing the second microservice container and the second service endpoint node, and the second remote computing device is prevented from accessing the first microservice container and the first service endpoint node.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary decrypted access token.

DETAILED DESCRIPTION

Figure 1:
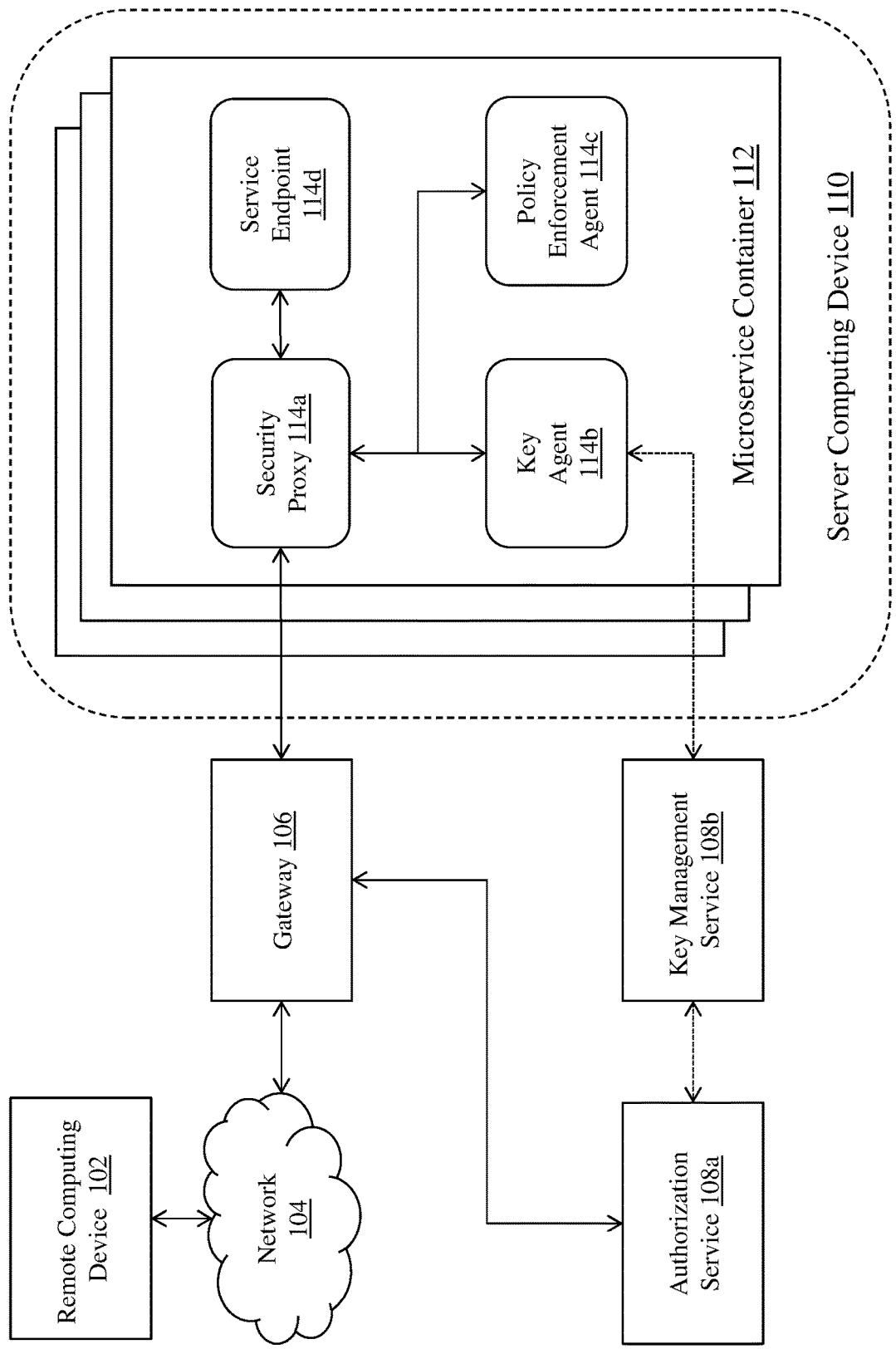
FIG. 1 is a block diagram of a system for decentralized authorization of user access requests in a distributed service architecture.

FIG. 1 is a block diagram of a system 100 for decentralized authorization of user access requests in a distributed service architecture. The system 100 includes a remote computing device 102, a communications network 104, a gateway node 106, an authorization service node 108a, a key management service node 108b, a server computing device 110 with a microservice container 112 that comprises a security proxy node 114a, a key agent node 114b, a policy enforcement agent node 114c, and a service endpoint 114d.

The remote computing device 102 connects to one or more communications networks (e.g., network 104) in order to communicate with the other components of the system 100 to provide input and receive output relating to requesting access to service endpoint 114d in microservice container 112 of server computing device 110 as described herein. Exemplary remote computing devices 102 include but are not limited to client computing devices such as desktop computers, laptop computers, tablets, mobile devices, and smartphones; web application servers; cloud-based computing systems; database management platforms; software-as-a-service (SaaS) platforms; sysadmin control devices; and the like. It should be appreciated that other types of computing devices that are capable of connecting to the components of the system 100 can be used without departing from the scope of invention. Although FIG. 1 depicts a single remote computing device 102, it should be appreciated that the system 100 can include any number of remote computing devices.

The communications network 104 enables the remote computing device 102 to communicate with the microservice container 112 of server computing device 110 via gateway node 106. The network 104 is in some embodiments a wide area network, such as the Internet and/or a cellular network. In some embodiments, the network 104 is comprised of several discrete networks and/or sub-networks (e.g., cellular to Internet). In some embodiments, the network 104 can be used to connect all or a portion of the components of system 100 to each other to perform the functionality associated with decentralized authentication of user access requests in a distributed service architecture as described herein.

The gateway node 106 is a computing device or devices including hardware and/or software modules that execute on a processor and interact with memory modules of the gateway node 106, to receive access requests from remote computing device 102, encapsulate the access requests with authorization information using the authorization service node 108a, and transmit the encapsulated access requests to the server computing device 110 for authorization of the access request by the security proxy node 114a and the provision of functionality from the service endpoint node 114d.

The authorization service node 108a is a computing device or devices including hardware and/or software modules execute on a processor and interact with memory modules of the authorization service node 108a, to provide authorization information to the gateway node 106 that is used to encapsulate the access request received from the remote computing device 102 for transmission to the security proxy node 114a of the server computing device 110. The authorization service node 108a operates in conjunction with the key management service node 108b, which is a computing device or devices including hardware and/or software modules execute on a processor and interact with memory modules of the key management service node 108b. The key management service node 108b creates, distributes, and rotates public and private key pairs that are used by the authorization service node 108a and the key agent node 114c for authorization processes as described herein.

The server computing device 110 is a computing device including specialized hardware and/or software modules that execute on a processor and interact with memory modules of the server computing device 110, to receive data from other components of the system 100, transmit data to other components of the system 100, and perform functions for decentralized authorization of user access requests in a distributed service architecture as described herein. In some embodiments, the server computing device 110 can comprise a plurality of physical computing devices, arranged in a variety of architectures, resources, and configurations (e.g., cluster computing, virtual computing, cloud computing) can be used without departing from the scope of the invention.

The server computing device 110 includes a plurality of microservice containers (e.g., container 112) that each comprise a security proxy node 114a, a key agent node 114b, a policy enforcement agent node 114c, and a service endpoint node 114c. In some embodiments, the nodes 114a, 114b, 114c, 114d are specialized sets of computer software instructions programmed onto one or more dedicated processors in the server computing device 110. The functionality of the microservice containers (e.g., container 112) and nodes 114a-114d will be described in greater detail throughout this specification.

It is important to note that the system 100 does not include a centralized repository or service that processes authorization requests received from remote computing devices. As mentioned above, such centralized mechanisms for authorizing users typically result in increased latency and reduced scalability, as authorization requests must be processed by the central authority—which can cause bottlenecks and delays in determining user access policies and permissions, and responding to authorization requests. Instead, as described herein, the present systems and methods advantageously employ a decentralized authorization architecture, where each microservice container (e.g., container 112) performs user authorization for service access requests that are received by the container and not relaying the requests to, or otherwise interfacing with, a central database. This results in much faster authorization of user access requests with appropriate resources made available for the user's specific profile and policies, which leads to lower overall latency on transactions and functionality provided by the service endpoint node (e.g., node 114d).

Figure 2:
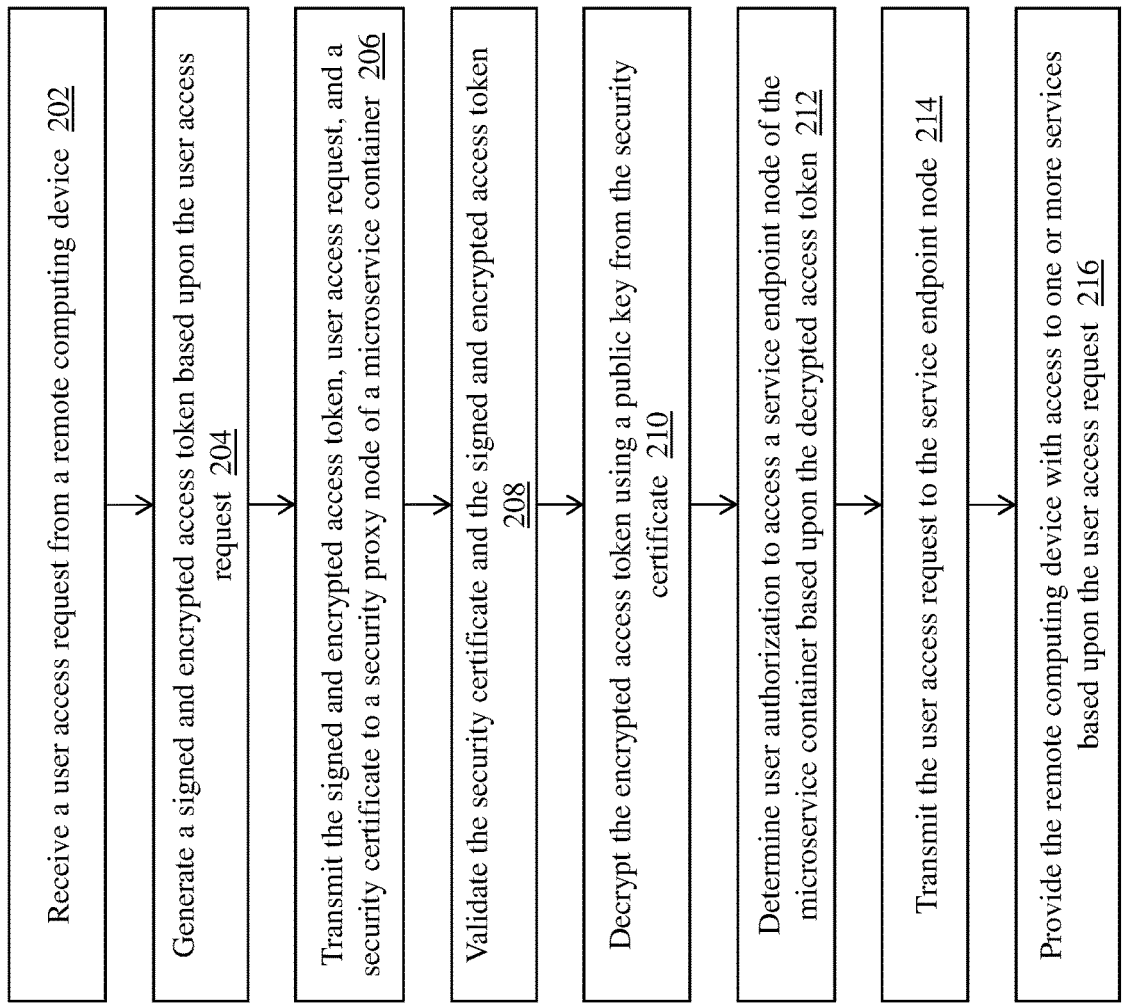
FIG. 2 is a flow diagram of a computerized method of decentralized authorization of user access requests in a distributed service architecture.

FIG. 2 is a flow diagram of a computerized method 200 of decentralized authentication of user access requests in a distributed service architecture, using the system 100 of FIG. 1. The gateway node 106 receives (step 202) a user access request from a remote computing device 102 (e.g., via network 104). A user at remote computing device 102 (which may be a client computing device) can establish a connection to gateway node 106 and submit a user access request for certain service functionality (e.g., to access the user's account information, perform a transaction such as a stock trade, etc.) provided by one or more service endpoint nodes 114d. For example, the user at remote computing device 102 accesses a web browser or native application installed on the remote computing device 102 to, e.g., submit user credentials (username, password) and transmit the user access request including the user credentials to the gateway node 106. In some embodiments, the gateway node 106 performs authentication on the submitted user credentials in order to verify that the remote computing device 102 and/or user at the device 102 is valid. In some embodiments, the remote computing device 102 can perform authentication of the user and/or user credentials prior to sending the user access request to the gateway node 106. In either case, the user authentication can be performed by transmitting the user credentials to a remote service that uses one or more authentication methods to verify the user credentials and confirm that the requesting user is legitimate.

In some embodiments, the remote computing device 102 is a computing device (such as another server computing device) which is not necessarily controlled directly by a user, that submits an access request for information or functionality to the server computing device 108 and the server computing device 108 must authenticate the remote computing device 102 in order to process the access request.

Upon receiving the user access request, the gateway node 106 generates (step 204) a signed and encrypted access token based upon the user access request. In some embodiments, the gateway node 106 performs this step by first creating an unencrypted access token based upon the user access request. For example, at the time the user access request is received, the gateway node 106 retrieves one or more claims that define certain access control parameters and features of the user. For example, the claims can comprise one or more roles assigned to the user, an id of the user, one or more resources (such as accounts, services, functionality, etc.) that the user is allowed to access, and the like. The gateway node 106 creates an access token (i.e., JSON Web Token (JWT) as described at datatracker.ietf.org/doc/html/rfc7519 which is incorporated herein by reference) to store the user's claims and transmits the unencrypted access token to the authorization service node 108a. The authorization service node 108a requests a private key or a private-public key pair from the key management service node 108b to be used in signing and encrypting the unencrypted access token. For example, the authorization service node 108a can store a digital certificate (e.g., x509 certificate) that contains a public key paired to the private key received from node 108b. In another example, the key management service node 108b provides a public-private key pair to the authorization service node 108a. In one embodiment, the key management service node 108b uses public key infrastructure (PKI) to manage the signing and encryption process. Details regarding the implementation of a public key infrastructure are described at en.wikipedia.org/wiki/Public_key_infrastructure, which is incorporated herein by reference. The key management service node 108b creates, distributes and rotates the public keys used by the system 100. As shown in FIG. 1, the key management service node 108b is communicably coupled to the key agent node 114b in each microservice container 112. As will be explained in detail below, the key agent node 114b receives public keys from the key management service node 108b in order to validate and decrypt access tokens received as part of user access requests.

In some embodiments, the authorization service node 108a uses the private key from the key pair to encrypt and sign the unencrypted access token. For example, the node 108a creates a hash value for the unencrypted access token using, e.g., a cryptographic hash algorithm. Then, the node 108a encrypts the hash value using the private key obtained from the key management service node 108b and incorporates the encrypted hash value (i.e., the signature) into the access token—thereby generating a signed and encrypted access token associated with the user/remote computing device 102. The authorization service node 108a transmits the signed and encrypted access token and the digital certificate containing the public key (which can be stored at the authorization service node 108a) to the gateway node 106.

The gateway node 106 then transmits (step 206) the signed and encrypted access token and public key digital certificate received from node 108a, and the user access request as originally received from the remote computing device 102, to a security proxy node 114a of a microservice container 112 at server computing device 110. As can be appreciated, the server computing device 110 can comprise a plurality of microservice containers 112, each associated with a different application, service, or other functionality provided by the server computing device 110. The implementation of a plurality of microservice containers enables the server computing device 110 to utilize shared resources (e.g., namespaces, filesystem volumes, network resources, storage, etc.) for multiple independent software images and related dependencies, for a plurality of individual users. An example microservice architecture that can be used by the systems and methods described herein is the Kubernetes™ platform (available from kubernetes.io), in which pods are deployed to host one or more application containers that work together to provide a unit of service (such as access to and functionality from a service endpoint) to the remote computing device 102. The nodes 114a-114d of microservice container 112 operate to verify the remote computing device's authorization to access the requested service(s) and functionality and to provide the requested service(s) to the remote computing device 102. Due to the decentralized and scalable nature of the microservice architecture, each user request can be processed by a different microservice container 112—enabling efficient parallel processing of user requests and minimal latency or bottlenecking disruptions.

The security proxy node 114a receives the user access request, the signed and encrypted access token, and the public key certificate from the gateway node 106, and the node 114a validates (step 208) the public key security certificate and the signed and encrypted access token and decrypts (step 210) the access token. In some embodiments, the security proxy node 114a requests the public key that corresponds to the signed and encrypted access token from the key agent node 114b in the microservice container 112. As mentioned above, the key agent node 114b is communicably coupled to the key management service node 108b in order for the node 114b to receive public keys used to validate and decrypt the access token. As can be appreciated, the key management service node 108b periodically rotates public keys in and out of use and coordinates with the key agent node 114b to ensure that the up-to-date set of public keys is available at the key agent node 114b.

Figure 3:
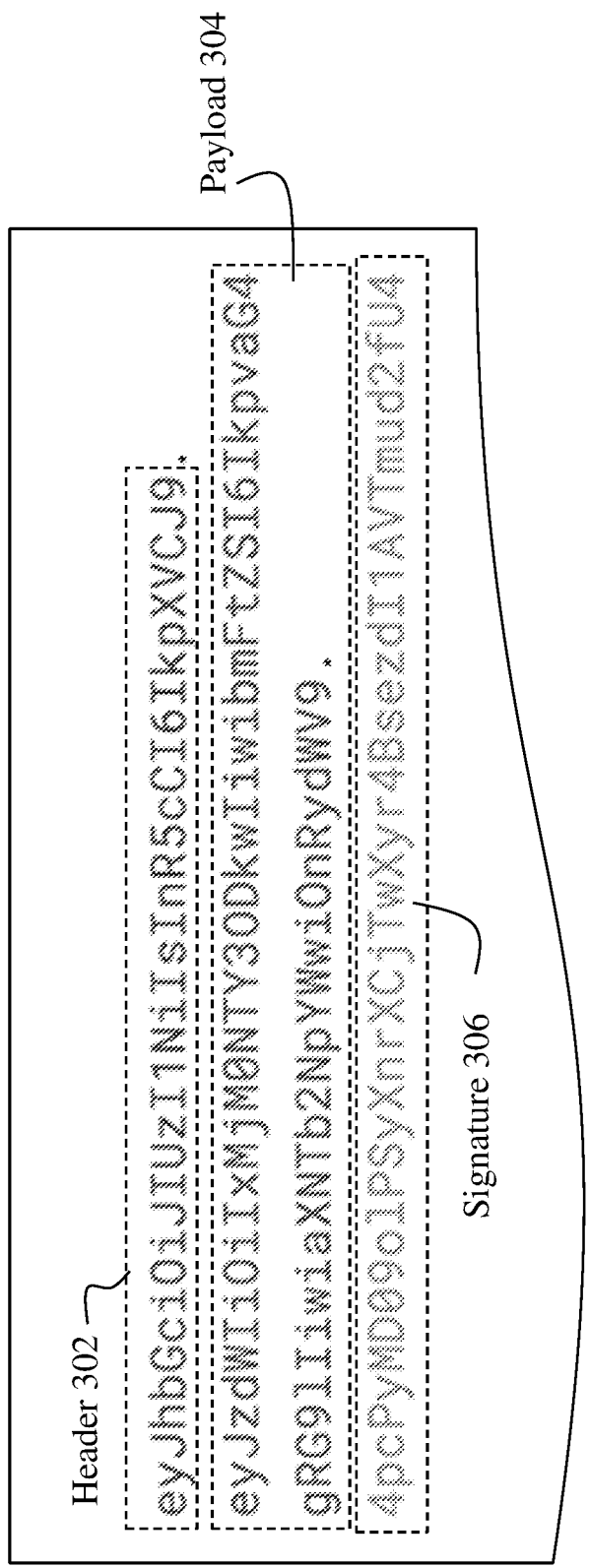
FIG. 3 is a diagram of an exemplary signed and encrypted access token.

The node 114a then validates the signature in the certificate using the public key. In some embodiments, the security proxy node 114a can analyze characteristics of the access token to ensure that the access token conforms to an expected structure. The node 114a can verify that the access token contains three segments, separated by two period characters. The node 114a can parse the access token to extract the three segments—the Header, the Payload, and the Signature. In an example, each segment is encoded using base64url (as described in RFC4648, The Base16, Base32, and Base64 Data Encodings, available at datatracker.ietf.org/doc/html/rfc4648, which is incorporated by reference). An exemplary signed and encrypted access token 300 is shown in FIG. 3. The token 300 includes a Header 302, a Payload 304, and a Signature 306. The Header 302 comprises metadata about the type of token, cryptographic algorithm(s) used to encrypt the token, and the like. The Payload 304 comprises the set of claims, i.e., the security statements noted above such as the user id, user roles, and resources that the user is allowed to access. The Signature 306 comprises the data used to verify that the access token is valid.

The security proxy node 114a can decode the Header and Payload using base64url and (i) ensure that the decoded Header and Payload have no line breaks, whitespace, or other additional characters and (ii) verify that the decoded Header and Payload are valid JSON objects. FIG. 4 is a diagram of an exemplary decoded access token 400. As shown in FIG. 4, the decoded access token comprises a JSON object for the Header 402 and a JSON object for the Payload 404. The decoded access token 400 also comprises a Signature section 406 with the algorithm used to create the signature. Next, the security proxy node 114a can verify the Signature. In some embodiments, the node 114a can generate a new signature using the public key and verify that the new signature matches the signature in the digital certificate. To generate a new signature, the node 114a can take the original base64url-encoded Header and Payload segments and hash them using a cryptographic hash (e.g., SHA-256, as described at en.wikipedia.org/wiki/SHA-2). Then, the node 114a can encrypt the cryptographic hash using the public key and encode the result with base64url. If the new encoded signature matches the signature in the access token, then the access token is verified. It should be appreciated that the above description is merely an example of validating the access token and other approaches can be used without departing from the scope of invention described herein.

Once the access token is validated and decrypted, the security proxy node 114a determines (step 212) user authorization to access the service endpoint node 114d of the microservice container 112 based upon the decrypted access token. In some embodiments, the security proxy node 114a extracts the user identifier (e.g., user id) and the one or more access permissions (e.g., claims) associated with the user from the Payload of the decrypted access token. The security proxy node 114a transmits the user identifier and the one or more access permissions associated with the user to the policy enforcement agent node 114c in the microservice container. The policy enforcement agent node 114c is configured to enforce both coarse-grained and fine-grained access control policies according to the received user id and access permissions. For example, the policy enforcement agent node 114c can analyze the user id and the claims using one or more preconfigured policies to determine whether the requested access complies with the user's permissions for access to the service endpoint node 114d and/or specific functionality of the node 114d. Based upon this analysis, the node 114c can generate an indication that the user is allowed (or the user is not allowed) to access the service endpoint node 114d according to the request. The policy enforcement agent node 114c returns the indication to the security proxy node 114a.

When access is granted by the policy enforcement agent node 114c, the security proxy node 114a transmits (step 214) the user access request to the service endpoint node 114d, and the service endpoint node 114d provides (step 216) the remote computing device 102 with access to one or more services based upon the user access request. For example, the security proxy node 114a can establish a connection between the remote computing device 102 and the service endpoint node 114d (e.g., using a URL or other type of address or reference pointer to the service endpoint). The service endpoint node 114d can receive the user access request from the security proxy node 114a and process the user access request in order to respond to the user access request with the desired resources. For example, the service endpoint node 114d can retrieve data, execute one or more transactions, and the like in response to the user access request.

In some embodiments, the service endpoint node 114d calls to one or more other service endpoints and/or network resources that are not in the microservice container 112 in order to respond to the user access request. In these embodiments, the techniques described herein advantageously enable the user access request to be processed by these other endpoints without requiring further authorization of the remote computing device 102 and/or the user of device 102—because the user access request has already been authorized by the security proxy node 114a.

Figure 5:
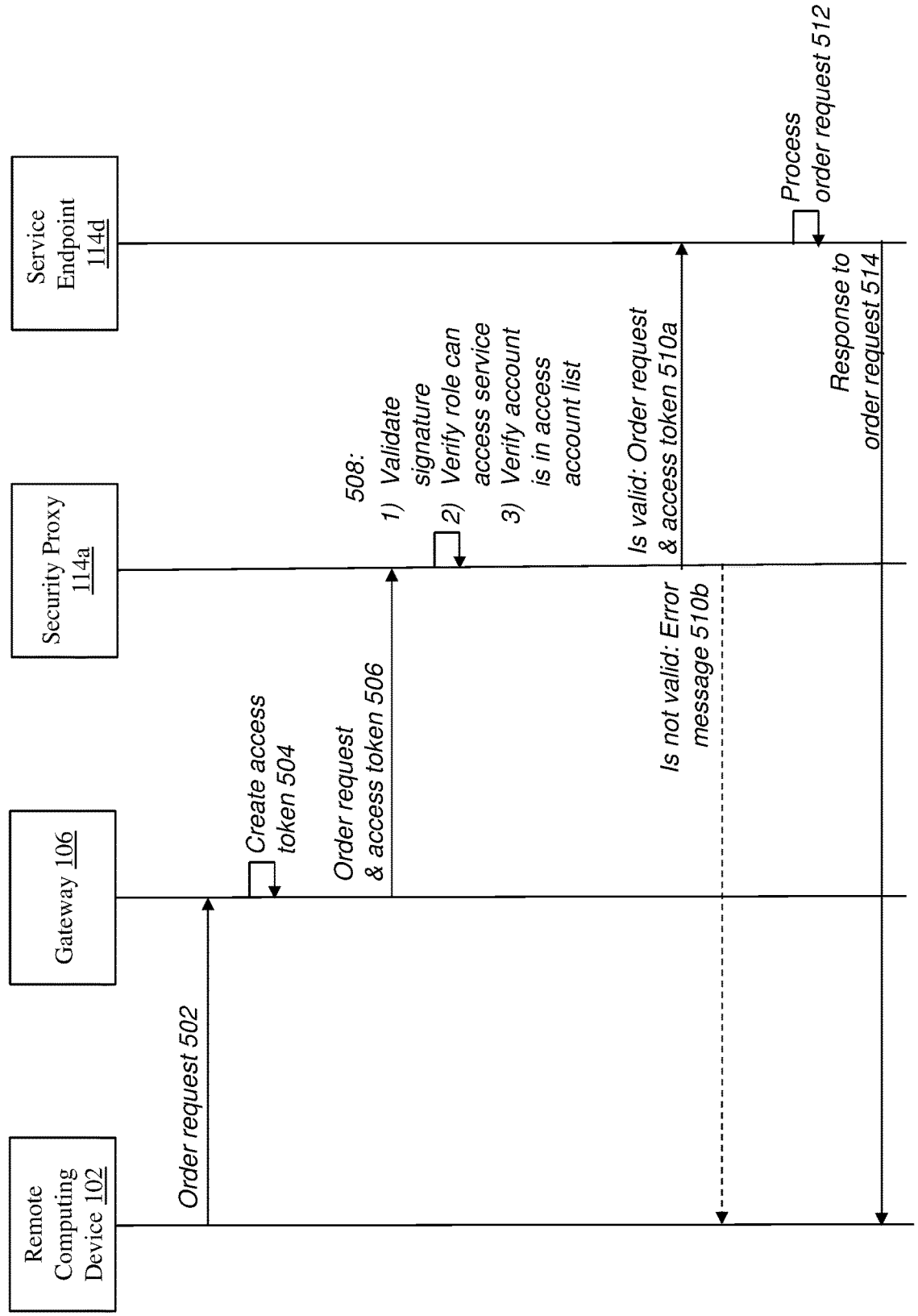
FIG. 5 is a diagram of an exemplary workflow for decentralized authorization of user access requests in a distributed service architecture.

FIG. 5 is a diagram of an exemplary use case workflow for decentralized authorization of user access requests in a distributed service architecture, using the system 100 of FIG. 1. At step 502, an authenticated user at remote computing device 102 generates and transmits an order request to gateway 106. The order request includes an account number. At step 504, gateway 106 creates a signed access token with one or more user access claims, e.g., identifying a user id, one or more roles for the user id, and a list of accounts the user id can access. At step 506, gateway 106 transmits the signed access token and the order request to security proxy 114a in microservice container 112 at server computing device 110. At step 508, security proxy 114a performs several steps: 1) validation of the signature on the access token; 2) verification that the user role in the access token has access to the service endpoint 114d requested in the order request; and 3) verification that the account in the order request is in the list of accounts in the access token. If the request is valid, at step 510a security proxy 114a transmits the order request to service endpoint 114d, at step 512 service endpoint 114d processes the order request and at step 514 service endpoint 114d transmits a response to the order request to remote computing device 102. If the request is not valid, at step 510b security proxy 114a transmits a security error message to remote computing device 102.

As mentioned above, another important aspect of the systems and methods described herein is the benefit of enabling customer/firm/end user-specific computing instances, data stores, software functionality, and other resources in the distributed computing environment. In such embodiments, each end user accesses an individual, separate computing infrastructure within the distributed environment, comprising elements such as microservices, jobs, security domains, transport layer security, databases, logs, messaging, in-memory caches, and so forth. Furthermore, each individual computing infrastructure is configured with distinct identity, authorization, and authentication processes that confirm the corresponding firm's access permissions and provide only the service endpoints, data, code, and other resources that are available to the firm. In this way, the systems and methods provide a multi-tenancy distributed computing environment for a plurality of different customers, firms, or end users while also ensuring separation, independence, and personalized security of each customer's data, services, and functionality.

Figure 6:
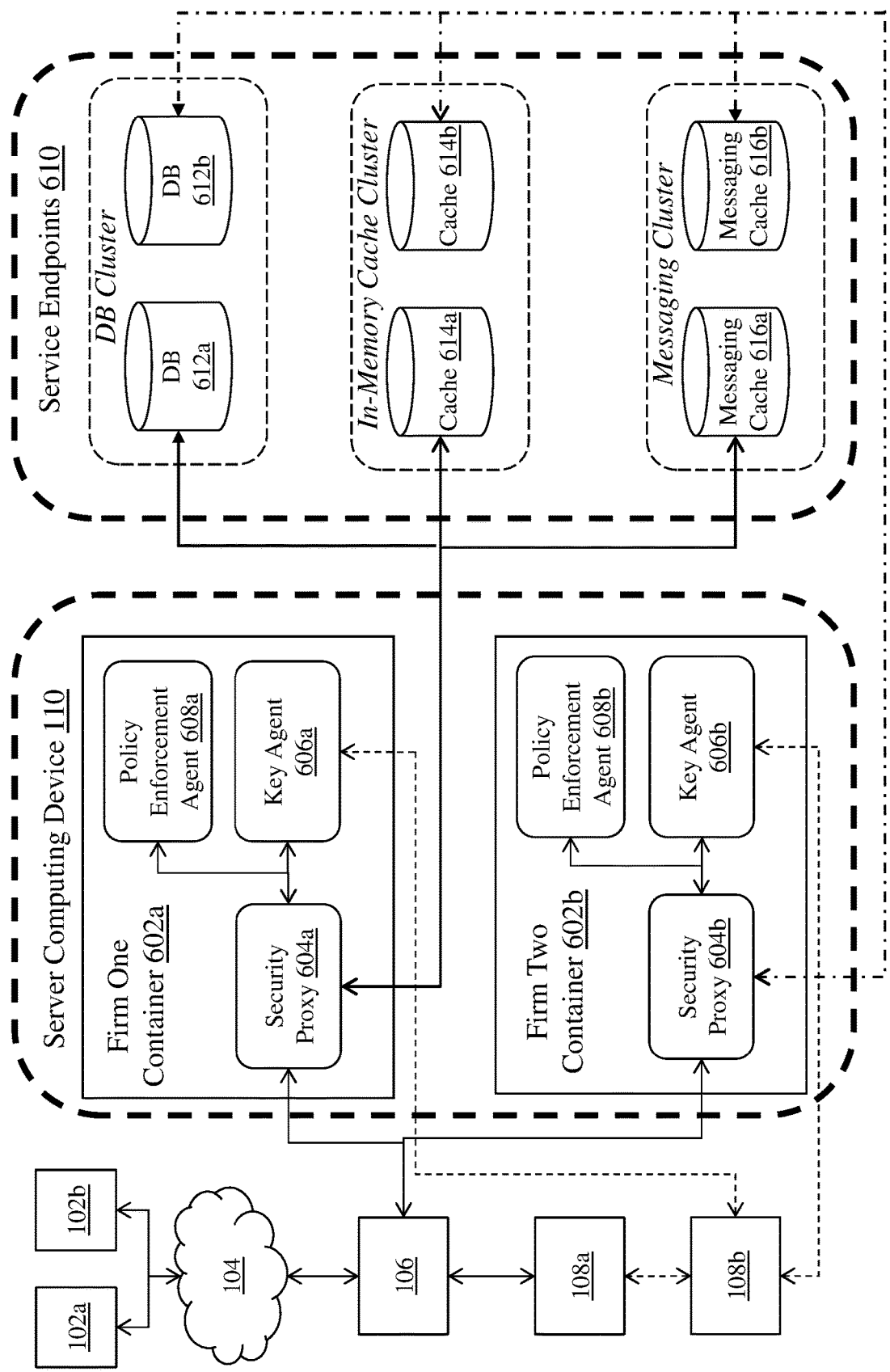
FIG. 6 is a block diagram of a system for decentralized authorization of user access requests in a multi-tenant distributed service architecture.

FIG. 6 is a block diagram of a system 600 for decentralized authorization of user access requests in a multi-tenant distributed service architecture. As can be appreciated, several of the elements of the system 600 are the same as those described above with respect to the system 100 of FIG. 1, so those detailed descriptions are not repeated again here. The system 600 includes a plurality of remote computing devices 102a-102b, a communications network 104, a gateway node 106, an authorization service node 108a, a key management service node 108b, a server computing device 110 with a plurality of microservices containers 602a-602b (each microservice container specific to a different end user) and service endpoints 610. As shown in FIG. 6, the microservices containers 602a-602b each comprise a security proxy 604a, 604b respectively, a key agent 606a, 606b respectively, and a policy enforcement agent 608a, 608b respectively. The functionality of the security proxies, key agents, and policy enforcement agents shown in FIG. 6 are the same as described above with respect to security proxy 114a, key agent 114b, and policy enforcement agent 114c of FIG. 1. The service endpoints 610 comprise a database (DB) cluster with a plurality of databases 612a-612b, an in-memory cache cluster with a plurality of caches 614a-614b, and a messaging cluster with a plurality of messaging caches 616a-616b. Each of these service endpoints 610 comprise similar functionality to the service endpoint 114d of FIG. 1 (described above). An additional feature of the system 600 of FIG. 6 is the ability to provide a single distributed computing environment that handles a multi-tenancy infrastructure. As can be appreciated, business or regulatory rules may require an enterprise to completely separate each tenant's data, services, endpoints, software code, accounts, transaction processing, and other functionality in the distributed computing environment.

Figure 7:
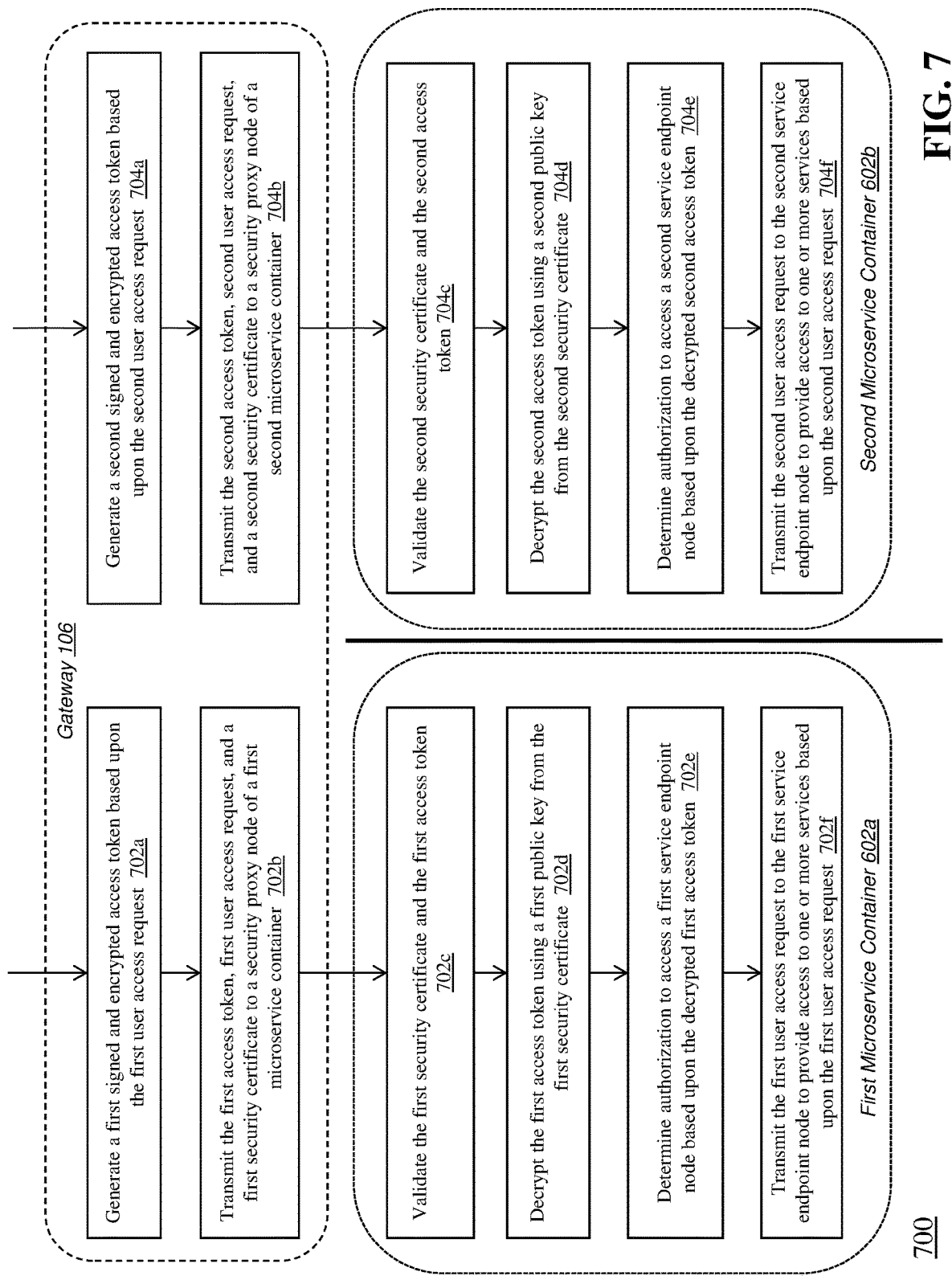
FIG. 7 is a flow diagram of a computerized method of for decentralized authorization of user access requests in a multi-tenant distributed service architecture.

FIG. 7 is a flow diagram of a computerized method of for decentralized authorization of user access requests in a multi-tenant distributed service architecture, using the system 600 of FIG. 6. The gateway node 106 receives a separate user access request from each of a plurality of remote computing devices 102a-102b (e.g., via network 104). As can be appreciated, a first remote computing device 102a that submits a first user access request can be associated with a first end user (e.g., a customer, a firm, etc.) and a second remote computing device 102b that submits a second user access request can be associated with a second end user. Because the end users are different, the gateway node 106 must ensure that the processes of user authentication and provision of services to each of the remote computing devices 102a-102b are isolated from each other. A first end user at remote computing device 102a (which may be a client computing device) can establish a connection to gateway node 106 and submit a first user access request for certain service functionality (e.g., to access the user's account information, perform a transaction such as a stock trade, etc.) provided by one or more service endpoint nodes 610 that are specific to the first end user. For example, the first end user at remote computing device 102a accesses a web browser or native application installed on the remote computing device 102a to, e.g., submit user credentials (username, password) and transmit the user access request including the user credentials to the gateway node 106. In some embodiments, the gateway node 106 performs authentication on the submitted user credentials in order to verify that the remote computing device 102a and/or user at the device 102a is valid. In some embodiments, the remote computing device 102a can perform authentication of the user and/or user credentials prior to sending the user access request to the gateway node 106. In either case, the user authentication can be performed by transmitting the user credentials to a remote service that uses one or more authentication methods to verify the user credentials and confirm that the requesting user is legitimate. In some embodiments, the remote computing device 102a is a computing device (such as another server computing device) which is not necessarily controlled directly by a user, that submits an access request for information or functionality to the server computing device 110 and the server computing device 110 must authenticate the remote computing device 102a in order to process the access request.

Similarly, a second end user at a different remote computing device 102b can establish a connection to gateway node 106 and submit a second user access request for certain service functionality provided by one or more service endpoint nodes 610 that are specific to the second end user. For example, the second end user at remote computing device 102b can submit user credentials as part of the second user access request and transmit the second user access request including the user credentials to the gateway node 106. In some embodiments, the gateway node 106 performs authentication on the submitted user credentials in order to verify that the remote computing device 102b and/or user at the device 102b is valid. In some embodiments, the remote computing device 102b can perform authentication of the user and/or user credentials prior to sending the user access request to the gateway node 106. In either case, the user authentication can be performed by transmitting the user credentials to a remote service that uses one or more authentication methods to verify the user credentials and confirm that the requesting user is legitimate. As can be appreciated, the first user access request and the second user access request can be received synchronously or asynchronously by gateway node 106.

Upon receiving the user access requests, the gateway node 106 generates (step 702a) a first signed and encrypted access token based upon the first user access request and the gateway node 106 generates (step 704a) a second signed and encrypted access token based upon the second user access request. In some embodiments, the gateway node 106 performs steps 702a, 704a by first creating a corresponding unencrypted access token based upon the respective user access request. For example, at the time the corresponding user access request is received, the gateway node 106 retrieves one or more claims that define certain access control parameters and features of the end user associated with the request. For example, the claims can comprise one or more roles assigned to the end user, an id of the user, one or more resources (such as accounts, services, functionality, etc.) that the end user is allowed to access, and the like. The gateway node 106 creates an access token (i.e., JSON Web Token (JWT) as described at datatracker.ietf.org/doc/html/rfc7519 which is incorporated herein by reference) to store the user's claims and transmits the corresponding unencrypted access token to the authorization service node 108a. The authorization service node 108a requests a private key or a private-public key pair that is specific to the corresponding access token from the key management service node 108b to be used in signing and encrypting the unencrypted access token. For example, the authorization service node 108a can store a digital certificate (e.g., x509 certificate) that contains a public key paired to the private key received from node 108b. In another example, the key management service node 108b provides a public-private key pair to the authorization service node 108a. In one embodiment, the key management service node 108b uses public key infrastructure (PKI) to manage the signing and encryption process. Details regarding the implementation of a public key infrastructure are described at en.wikipedia.org/wiki/Public_key_infrastructure, which is incorporated herein by reference. The key management service node 108b creates, distributes and rotates the public keys used by the system 600. As shown in FIG. 6, the key management service node 108b is communicably coupled to the key agent nodes 606a, 606b in each microservice container 602a, 602b. As will be explained in detail below, the key agent nodes 606a, 606b receive separate public keys that are specific to the corresponding end user and/or access request from the key management service node 108b in order to validate and decrypt access tokens received as part of user access requests.

In some embodiments, the authorization service node 108a uses the private key from the corresponding key pair to encrypt and sign the unencrypted access token. For example, the node 108a creates a hash value for the unencrypted access token using, e.g., a cryptographic hash algorithm. Then, the node 108a encrypts the hash value using the private key obtained from the key management service node 108b and incorporates the encrypted hash value (i.e., the signature) into the access token—thereby generating a signed and encrypted access token associated with the user/remote computing device 102. The authorization service node 108a transmits the signed and encrypted access token and the digital certificate containing the public key (which can be stored at the authorization service node 108a) to the gateway node 106.

The gateway node 106 then transmits (step 702b) the first signed and encrypted access token and first public key digital certificate received from node 108a, and the first user access request as originally received from the remote computing device 102a, to a security proxy node 604a of a microservice container 602a at server computing device 110 that is specifically allocated to the first end user. Similarly, the gateway node 106 transmits (step 704b) the second signed and encrypted access token and second public key digital certificate received from node 108a, and the second user access request as originally received from the remote computing device 102b, to a security proxy node 604b of another microservice container 602b at server computing device 110 that is specifically allocated to the second end user. As can be appreciated, the server computing device 110 can comprise a plurality of microservice containers 602a, 602b, each associated with a different end user. The implementation of a plurality of microservice containers enables the server computing device 110 to utilize shared computing resources (e.g., filesystem volumes, network resources, processors, etc.) of the distributed computing environment for multiple independent software images and related dependencies, databases, and container instances for a plurality of individual tenants. An example microservice architecture that can be used by the systems and methods described herein is the Kubernetes™ platform (available from kubernetes.io), in which pods are deployed to host one or more application containers that work together to provide a unit of service (such as access to and functionality from a service endpoint) to the remote computing devices 102a, 102b. The nodes 604a, 606a, and 608a of microservice container 602a operate to verify the remote computing device's 102a authorization to access the requested service(s) and functionality and to provide the requested service(s) to the remote computing device 102a. Likewise, the nodes 604b, 606b, and 608b of microservice container 602b operate to verify the remote computing device's 102b authorization to access the requested service(s) and functionality and to provide the requested service(s) to the remote computing device 102b.

Due to the decentralized and scalable nature of the microservice architecture, each user request is processed by a different microservice container 602a, 602b enabling efficient parallel processing of user requests and minimal latency or bottlenecking disruptions. Also, as can be appreciated, the multi-tenant implementation described herein is configured to isolate all firm-specific resources from each other. For example, in a Kubernetes™ implementation, all tenant-specific microservices and jobs execute in isolation with security domains enforced using tenant-specific Kubernetes names space, tenant scoped microservice identities, and mTLS (mutual TLS).

The security proxy nodes 604a, 604b receive the respective first and second user access requests, the respective first and second signed and encrypted access tokens, and the respective first and second public key certificates from the gateway node 106. Node 604a validates (step 702c) the first public key security certificate and the first signed and encrypted access token and decrypts (step 702d) the first access token. In some embodiments, the security proxy node 604a requests the first public key that corresponds to the first signed and encrypted access token from the key agent node 606a in the microservice container 602a. As mentioned above, the key agent node 606a is communicably coupled to the key management service node 108b in order for the node 606a to receive public keys for the specific tenant that are used to validate and decrypt the first access token. As can be appreciated, the key management service node 108b periodically rotates public keys in and out of use and coordinates with the key agent node 606a to ensure that the up-to-date set of public keys is available at the key agent node 606a.

The node 606a then validates the signature in the first certificate using the first public key. In some embodiments, the security proxy node 604a can analyze characteristics of the first access token to ensure that the first access token conforms to an expected structure. The node 604*a* can verify that the first access token contains three segments, separated by two period characters. The node 604*a* can parse the first access token to extract the three segments—the Header, the Payload, and the Signature. In an example, each segment is encoded using base64url (as described in RFC4648, The Base16, Base32, and Base64 Data Encodings, available at datatracker.ietf.org/doc/html/rfc4648, which is incorporated by reference).

The security proxy node 604*a* can decode the Header and Payload of the first access token using base64url and (i) ensure that the decoded Header and Payload have no line breaks, whitespace, or other additional characters and (ii) verify that the decoded Header and Payload are valid JSON objects. Next, the security proxy node 114*a* can verify the Signature. In some embodiments, the node 604*a* can generate a new signature using the first public key and verify that the new signature matches the signature in the first digital certificate. To generate a new signature, the node 604*a* can take the original base64url-encoded Header and Payload segments and hash them using a cryptographic hash (e.g., SHA-256, as described at en.wikipedia.org/wiki/SHA-2). Then, the node 604*a* can encrypt the cryptographic hash using the first public key and encode the result with base64url. If the new encoded signature matches the signature in the first access token, then the first access token is verified. It should be appreciated that the above description is merely an example of validating the first access token and other approaches can be used without departing from the scope of invention described herein. In a similar fashion, node 604*b* validates (step 704*c*) the second public key security certificate and the second signed and encrypted access token and decrypts (step 704*d*) the second access token.

Once the first and access tokens are validated and decrypted by the respective security proxy nodes 604*a*, 604*b*, the security proxy node 604*a* determines (step 702*e*) authorization of a first end user (at remote device 102*a*) to access a first service endpoint node (e.g., endpoint 612*a*, 614*a*, and/or 616*a*) based upon the decrypted first access token. Similarly, the security proxy node 604*b* determines (step 704*e*) authorization of a second end user (at remote device 102*b*) to access a second service endpoint node (e.g., endpoint 612*b*, 614*b*, and/or 616*b*) based upon the decrypted second access token. In some embodiments, the security proxy nodes 604*a*, 604*b* extract the respective first or second user identifier (e.g., user id for the corresponding first or second end user) and the one or more access permissions (e.g., claims) associated with the respective first or end user from the Payload of the corresponding decrypted first or second access token. The security proxy nodes 604*a*, 604*b* transmit the respective user identifier and the respective access permissions associated with the corresponding user to the associated policy enforcement agent nodes 608*a*, 608*b* in the respective microservice container 602*a*, 602*b*. The policy enforcement agent nodes 608*a*, 608*b* are configured to enforce both coarse-grained and fine-grained access control policies according to the received user id and access permissions. For example, the policy enforcement agent nodes 608*a*, 608*b* can analyze the corresponding user id and the claims using one or more preconfigured policies to determine whether the requested access complies with the specific user's permissions for access to their tenant-specific service endpoint nodes and/or specific functionality of the nodes. Based upon this analysis, the nodes 608*a*, 608*b* can generate an indication that the user is allowed (or the user is not allowed) to access the corresponding service endpoint node according to the respective request. The policy enforcement agent nodes 608*a*, 608*b* return the indication to the associated security proxy node 604*a*, 604*b*.

When access is granted by the policy enforcement agent nodes 608*a*, 608*b*, the security proxy node 604*a* transmits (step 7020 the first user access request to a first service endpoint node (e.g., endpoint 612*a*) for the service endpoint node 612*a* to provide the remote computing device 102*a* with access to one or more services based upon the first user access request. Similarly, the security proxy node 604*b* transmits (step 7040 the second user access request to a second service endpoint node (e.g., endpoint 612*b*) for the service endpoint node 612*b* to provide the remote computing device 102*b* with access to one or more services based upon the second user access request. For example, the respective security proxy nodes 604*a*, 604*b* can establish a connection between the corresponding remote computing devices 102*a*, 102*b* and the service endpoint nodes 612*a*, 612*b* (e.g., using a URL or other type of tenant-specific address or reference pointer to the specific service endpoint). The service endpoint nodes 612*a*, 612*b* can receive the respective first and second user access requests from the security proxy nodes 604*a*, 604*b* and process the user access requests in order to respond to the user access requests with the desired resources available only to the corresponding first or second end user. For example, the service endpoint nodes 612*a*, 612*b* can retrieve data, execute one or more transactions, and the like using tenant-specific data, code, and other resources in response to the user access request.

In some embodiments, the service endpoint nodes 612*a*, 612*b* can make calls to one or more other service endpoints and/or network resources associated only with the respective end user in order to respond to the corresponding user access request. In these embodiments, the techniques described herein advantageously enable the first or second user access request to be processed by these other endpoints without requiring further authorization of the remote computing devices 102*a*, 102*b* and/or the user of the respective devices 102*a*, 102*b*—because the user access requests have already been authorized by the corresponding security proxy nodes 604*a*, 604*b*.

Figure 8:
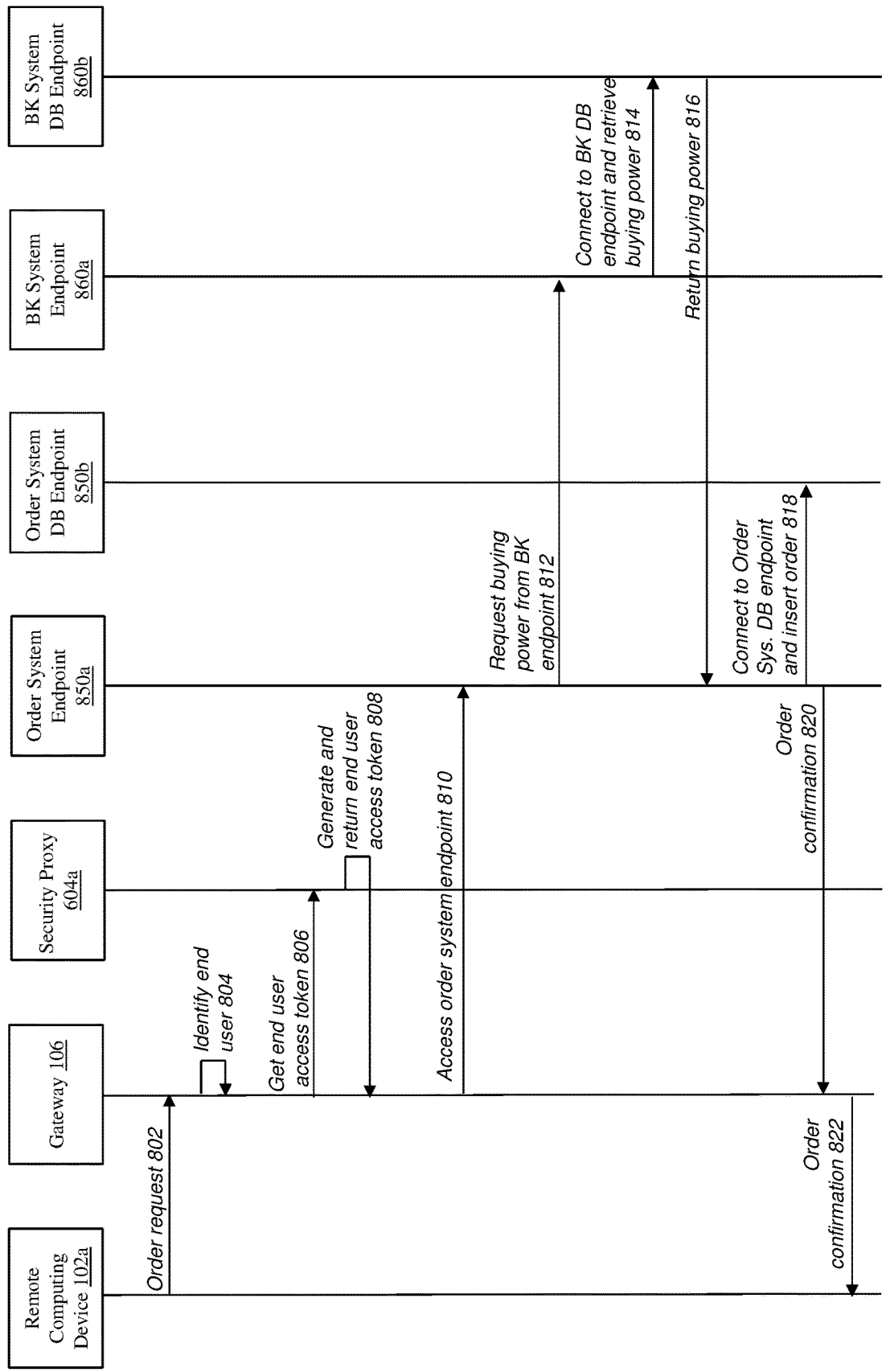
FIG. 8 is a diagram of an exemplary use case workflow for decentralized authorization of a first end user's access requests in a multi-tenant distributed service architecture.

FIG. 8 is a diagram of an exemplary use case workflow 800 for decentralized authorization of a first end user's access requests in a multi-tenant distributed service architecture, using the system 600 of FIG. 6. At step 802, an authenticated first end user at remote computing device 102*a* generates and transmits a first order request to gateway 106. The first order request includes a tenant-specific API key and AuthN token. At step 804, gateway 106 identifies the end user (and/or remote computing device 102*a*) using, e.g., the API key and AuthN token. At step 806, the gateway 106 communicates with the security proxy 604*a* for the microservice container 602*a* that is specific to the first end user and instructs the proxy 604*a* to create a first signed access token with one or more user access claims, e.g., identifying a first user id, one or more roles for the first user id, and a list of accounts the first user id can access. At step 808, security proxy 604*a* generates the specific first access token for the first end user and returns the first access token to gateway 106. At step 810, gateway 106 transmits the signed first access token and the first order request to security order system endpoint 850*a* (where endpoint 850*a* is exclusive to the first end user). At step 812, order system endpoint 850*a* requests the first end user's buying power from a bookkeeping system endpoint 860*a* exclusive to the first end user. At step 814, the bookkeeping system endpoint 860*a* connects to a bookkeeping system database endpoint 860*b* exclusive to the first end user and retrieves the first end user's buying power information. At step 816, the bookkeeping system database endpoint 860b returns the buying power information to the order system endpoint 850a. At step 818, the order system endpoint 850a connects to an order system database endpoint 850b exclusive to the first end user, and inserts a new order based upon, e.g., the buying power information and the first order request from the first end user. At step 820, the order system endpoint 850a transmits an order confirmation to gateway 106, and at step 822, the gateway 106 transmits the order confirmation to the remote computing device 102a for the first end user.

Figure 9:
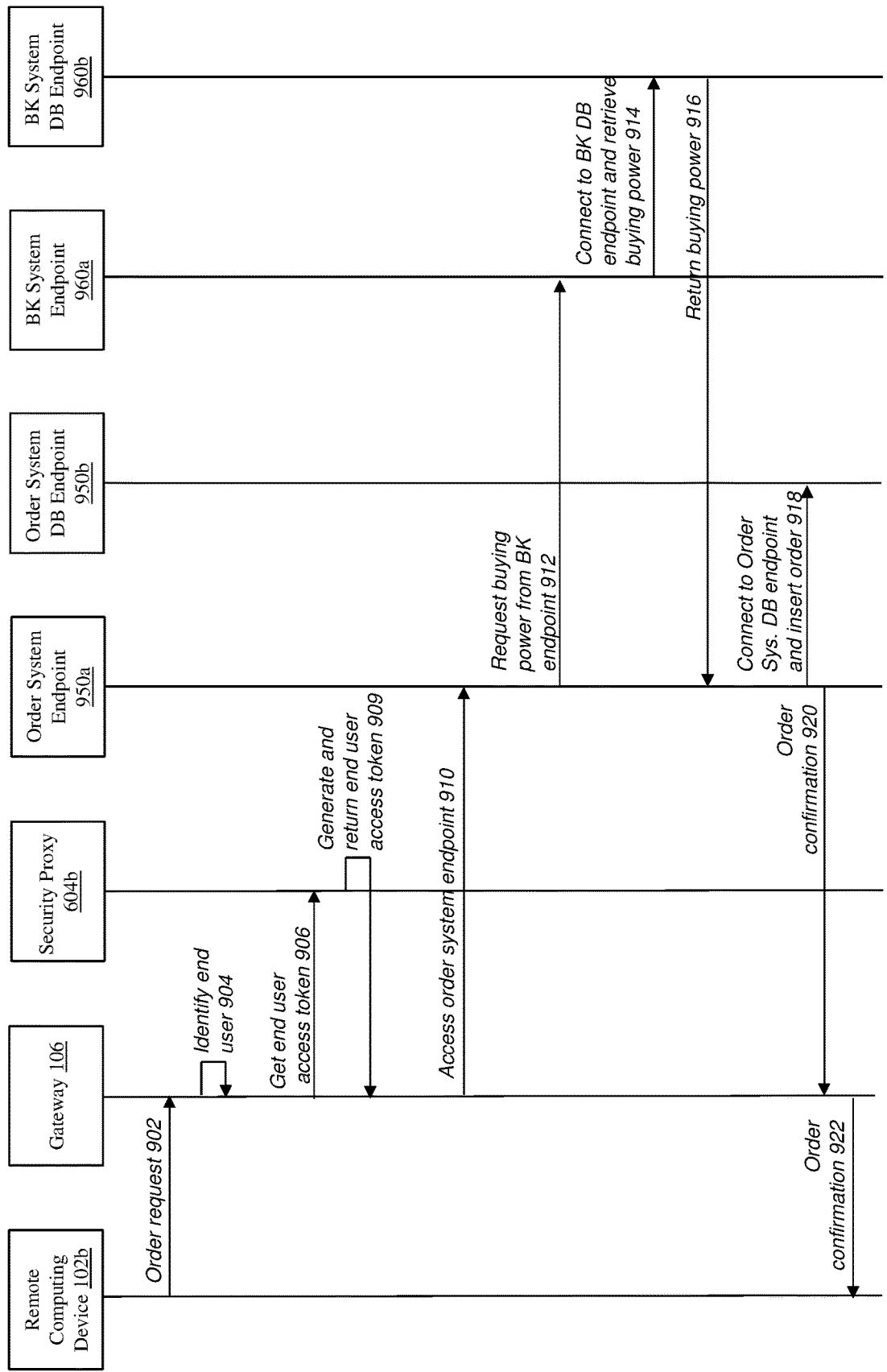
FIG. 9 is a diagram of an exemplary use case workflow for decentralized authorization of a second end user's access requests in a multi-tenant distributed service architecture.

FIG. 9 is a diagram of an exemplary use case workflow 900 for decentralized authorization of a second end user's access requests in a multi-tenant distributed service architecture, using the system 600 of FIG. 6. At step 902, an authenticated second end user at remote computing device 102b generates and transmits a second order request to gateway 106. The second order request includes a tenant-specific API key and AuthN token. At step 904, gateway 106 identifies the end user (and/or remote computing device 102b) using, e.g., the API key and AuthN token. At step 906, the gateway 106 communicates with the security proxy 604b for the microservice container 602b that is specific to the second end user and instructs the proxy 604b to create a second signed access token with one or more user access claims, e.g., identifying a second user id, one or more roles for the second user id, and a list of accounts the second user id can access. At step 908, security proxy 604b generates the specific second access token for the second end user and returns the second access token to gateway 106. At step 910, gateway 106 transmits the signed second access token and the second order request to security order system endpoint 950a (where endpoint 950a is exclusive to the second end user). At step 912, order system endpoint 950a requests the first end user's buying power from a bookkeeping system endpoint 960a also exclusive to the second end user. At step 914, the bookkeeping system endpoint 960a connects to a bookkeeping system database endpoint 960b exclusive to the second end user, and retrieves the second end user's buying power information. At step 916, the bookkeeping system database endpoint 960b returns the buying power information to the order system endpoint 950a. At step 918, the order system endpoint 950a connects to an order system database endpoint 950b exclusive to the second end user and inserts a new order based upon, e.g., the buying power information and the second order request from the second end user. At step 920, the order system endpoint 950a transmits an order confirmation to gateway 106, and at step 922, the gateway 106 transmits the order confirmation to the remote computing device 102b for the second end user.

As can be appreciated, the specific resources (e.g., security proxy 604a, order system endpoint 850a, database endpoint 850b, bookkeeping system endpoint 860a, database endpoint 860b) accessed by the first remote computing device 102a in FIG. 8 are entirely separate from the specific resources (e.g., security proxy 604b, order system endpoint 950a, database endpoint 950b, bookkeeping system endpoint 960a, database endpoint 960b) accessed by the second remote computing device 102b in FIG. 9. This illustrates the advantage of the multi-tenant architecture described herein from a security, data separation, and code independence standpoint.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for decentralized authorization of user access requests in a distributed service architecture, the system comprising:
   a gateway node,
   an authorization service node,
   a key management service node,
   a plurality of microservice containers each comprising a security proxy node, each microservice container associated with a different end user, and
   a plurality of service endpoint nodes, each service endpoint node associated with a different end user;
   wherein the gateway node:
     generates a first signed and encrypted access token based upon a first user access request using the authorization service node and the key management service node, the first user access request received from a first remote computing device associated with a first end user and the first signed and encrypted access token comprising a identifier specific to the first end user;
     generates a second signed and encrypted access token based upon a second user access request using the authorization service node and the key management service node, the second user access request received from a second remote computing device associated with a second end user and the second signed and encrypted access token comprising a identifier specific to the second end user;
     transmits the first signed and encrypted access token, the first user access request, and a first security certificate received from the authorization service node to a security proxy node of a first one of the plurality of microservice containers that is associated with the first end user;
     transmits the second signed and encrypted access token, the second user access request, and a second security certificate received from the authorization service node to a security proxy node of a second one of the plurality of microservice containers that is associated with the second end user; and
   wherein the security proxy node of the first microservice container:
     validates the first security certificate and the first signed and encrypted access token,
     decrypts the first signed and encrypted access token using a first public key from the first security certificate,
     determines authorization of the first end user to access a first service endpoint node based upon the decrypted first access token, and
     transmits the first user access request to the first service endpoint node to provide the first remote computing device with access to one or more services specific to the first end user based upon the first user access request; and wherein the security proxy node of the second microservice container:

validates the second security certificate and the second signed and encrypted access token, decrypts the second signed and encrypted access token using a second public key from the second security certificate, determines authorization of the second end user to access a second service endpoint node based upon the decrypted second access token, and transmits the second user access request to the second service endpoint node to provide the second remote computing device with access to one or more services specific to the second end user based upon the second user access request.

2. The system of claim 1, wherein the gateway node authenticates the first user access request before generating the first signed and encrypted access token and the gateway node authenticates the second user access request before generating the second signed and encrypted access token.

3. The system of claim 1, wherein the gateway node generating the first signed and encrypted access token based upon the first user access request using the authorization service node and the key management service node comprises:

the gateway node:
generating a first unencrypted access token comprising the identifier specific to the first end user and one or more access permissions associated with the first end user; and
transmitting the first unencrypted access token to the authorization service node;

the authorization service node:
requesting a first key pair from the key management service node, the first key pair comprising a first private key and the first public key;
signing and encrypting the first unencrypted access token using the first private key; and
transmitting the first signed and encrypted access token and the first security certificate comprising the first public key to the gateway node.

4. The system of claim 3, wherein the security proxy node of the first microservice container determining authorization of the first end user to access a first service endpoint node based upon the decrypted first access token comprises:

extracting the identifier specific to the first end user and the one or more access permissions associated with the first end user from the decrypted first access token;
transmitting the identifier specific to the first end user and the one or more access permissions associated with the first end user to a policy agent in the first microservice container; and
receiving from the policy agent in the first microservice container an indication to allow the first end user to access the first service endpoint node based upon the identifier specific to the first end user and the one or more access permissions associated with the first end user.

5. The system of claim 3, wherein the security proxy node of the first microservice container validating the first security certificate and the first signed and encrypted access token received from the gateway node comprises:

requesting the first public key that corresponds to the first signed and encrypted access token from the key management service;
validating a signature in the first security certificate using the first public key; and
validating the first signed and encrypted access token using the first security certificate.

6. The system of claim 1, wherein the gateway node generating the second signed and encrypted access token based upon the second user access request using the authorization service node and the key management service node comprises:

the gateway node:
generating a second unencrypted access token comprising the identifier specific to the second end user and one or more access permissions associated with the second end user; and
transmitting the second unencrypted access token to the authorization service node;

the authorization service node:
requesting a second key pair from the key management service node, the second key pair comprising a second private key and the second public key;
signing and encrypting the second unencrypted access token using the second private key; and
transmitting the second signed and encrypted access token and the second security certificate comprising the second public key to the gateway node.

7. The system of claim 6, wherein the security proxy node of the second microservice container determining authorization of the second end user to access a second service endpoint node based upon the decrypted second access token comprises:

extracting the identifier specific to the second end user and the one or more access permissions associated with the second end user from the decrypted second access token;
transmitting the identifier specific to the second end user and the one or more access permissions associated with the second end user to a policy agent in the second microservice container; and
receiving from the policy agent in the second micro service container an indication to allow the second end user to access the second service endpoint node based upon the identifier specific to the second end user and the one or more access permissions associated with the second end user.

8. The system of claim 6, wherein the security proxy node of the second microservice container validating the second security certificate and the second signed and encrypted access token received from the gateway node comprises:

requesting the second public key that corresponds to the second access token from the key management service;
validating a signature in the second security certificate using the second public key; and
validating the second signed and encrypted access token using the second security certificate.

9. The system of claim 1, wherein the first microservice container is configured with a first namespace that is specific to the first end user and the second microservice container is configured with a second namespace that is specific to the second end user.

10. The system of claim 9, wherein all processing services provided by the first microservice container are executed in isolation from all processing services provided by the second microservice container.

11. The system of claim 9, wherein the first service endpoint node is configured with a first set of addresses that are specific to the first end user and the second service endpoint node is configured with a second set of addresses that are specific to the second end user.

12. The system of claim 1, wherein the first remote computing device is prevented from accessing the second microservice container and the second service endpoint node, and the second remote computing device is prevented from accessing the first microservice container and the first service endpoint node.

13. A computerized method of decentralized authorization of user access requests in a distributed service architecture, the method comprising:
   generating, by a gateway node, a first signed and encrypted access token based upon a first user access request using an authorization service node and a key management service node, the first user access request received from a first remote computing device associated with a first end user and the first signed and encrypted access token comprising a identifier specific to the first end user;
   generating, by the gateway node, a second signed and encrypted access token based upon a second user access request using the authorization service node and the key management service node, the second user access request received from a second remote computing device associated with a second end user and the second signed and encrypted access token comprising a identifier specific to the second end user;
   transmitting, by the gateway node, the first signed and encrypted access token, the first user access request, and a first security certificate received from the authorization service node to a security proxy node of a first one of the plurality of microservice containers that is associated with the first end user;
   transmitting, by the gateway node, the second signed and encrypted access token, the second user access request, and a second security certificate received from the authorization service node to a security proxy node of a second one of the plurality of microservice containers that is associated with the second end user;
   the security proxy node of the first microservice container:
      validating the first security certificate and the first signed and encrypted access token received from the gateway node,
      decrypting the first signed and encrypted access token using a first public key from the first security certificate,
      determining authorization of the first end user to access the first service endpoint node based upon the decrypted first access token; and
      transmitting the first user access request to the first service endpoint node to provide the first remote computing device with access to one or more services specific to the first end user based upon the first user access request; and
   the security proxy node of the second microservice container:
      validating the second security certificate and the second signed and encrypted access token received from the gateway node,
      decrypting the second signed and encrypted access token using a second public key from the second security certificate,
      determining authorization of the second end user to access the second service endpoint node based upon the decrypted second access token; and
      transmitting the second user access request to the second service endpoint node to provide the second remote computing device with access to one or more services specific to the second end user based upon the second user access request.

14. The method of claim 13, wherein the gateway node authenticates the first user access request before generating the first signed and encrypted access token and the gateway node authenticates the second user access request before generating the second signed and encrypted access token.

15. The method of claim 13, wherein generating, by the gateway node, the first signed and encrypted access token based upon the first user access request using the authorization service node and the key management service node comprises:
   the gateway node:
      generating a first unencrypted access token comprising the identifier specific to the first end user and one or more access permissions associated with the first end user; and
      transmitting the first unencrypted access token to the authorization service node;
   the authorization service node:
      requesting a first key pair from the key management service node, the first key pair comprising a first private key and the first public key;
      signing and encrypting the first unencrypted access token using the first private key; and
      transmitting the first signed and encrypted access token and the first security certificate comprising the first public key to the gateway node.

16. The method of claim 15, wherein determining, by the security proxy node of the first microservice container, authorization of the first end user to access a first service endpoint node based upon the decrypted first access token comprises:
   extracting the identifier specific to the first end user and the one or more access permissions associated with the first end user from the decrypted first access token;
   transmitting the identifier specific to the first end user and the one or more access permissions associated with the first end user to a policy agent in the first microservice container; and
   receiving from the policy agent in the first microservice container an indication to allow the first end user to access the first service endpoint node based upon the identifier specific to the first end user and the one or more access permissions associated with the first end user.

17. The method of claim 15, wherein validating, by the security proxy node of the first microservice container, the first security certificate and the first signed and encrypted access token received from the gateway node comprises:
   requesting the first public key that corresponds to the first signed and encrypted access token from the key management service;
   validating a signature in the first security certificate using the first public key; and
   validating the first signed and encrypted access token using the first security certificate.

18. The method of claim 13, wherein generating, by the gateway node, the second signed and encrypted access token based upon the second user access request using the authorization service node and the key management service node comprises:

the gateway node:
- generating a second unencrypted access token comprising the identifier specific to the second end user and one or more access permissions associated with the second end user; and
- transmitting the second unencrypted access token to the authorization service node;

the authorization service node:
- requesting a second key pair from the key management service node, the second key pair comprising a second private key and the second public key;
- signing and encrypting the second unencrypted access token using the second private key; and
- transmitting the second signed and encrypted access token and the second security certificate comprising the second public key to the gateway node.

19. The method of claim 18, wherein determining, by the security proxy node of the second microservice container, authorization of the second end user to access a second service endpoint node based upon the decrypted second access token comprises:
- extracting the identifier specific to the second end user and the one or more access permissions associated with the second end user from the decrypted second access token;
- transmitting the identifier specific to the second end user and the one or more access permissions associated with the second end user to a policy agent in the second microservice container; and
- receiving from the policy agent in the second micro service container an indication to allow the second end user to access the second service endpoint node based upon the identifier specific to the second end user and the one or more access permissions associated with the second end user.

20. The method of claim 18, wherein validating, by the security proxy node of the second microservice container, the second security certificate and the second signed and encrypted access token received from the gateway node comprises:
- requesting the second public key that corresponds to the second signed and encrypted access token from the key management service;
- validating a signature in the second security certificate using the second public key; and
- validating the second signed and encrypted access token using the second security certificate.

21. The method of claim 13, wherein the first microservice container is configured with a first namespace that is specific to the first end user and the second microservice container is configured with a second namespace that is specific to the second end user.

22. The method of claim 21, wherein all processing services provided by the first microservice container are executed in isolation from all processing services provided by the second microservice container.

23. The method of claim 22, wherein the first service endpoint node is configured with a first set of addresses that are specific to the first end user and the second service endpoint node is configured with a second set of addresses that are specific to the second end user.

24. The method of claim 13, wherein the first remote computing device is prevented from accessing the second microservice container and the second service endpoint node, and the second remote computing device is prevented from accessing the first microservice container and the first service endpoint node.

* * * * *